United States Patent [19]

Guo et al.

[11] Patent Number: 5,328,958
[45] Date of Patent: Jul. 12, 1994

[54] THERMOPLASTIC RESINS BASED ON VINYL AROMATIC/VINYL PHOSPHONIC ACID COPOLYMERS AND AMINE-TERMINATED POLYMERS

[75] Inventors: Shao-Hua Guo; Roger A. Grey, both of West Chester, Pa.

[73] Assignee: Arco Chemical Technology, L.P., Wilmington, Del.

[21] Appl. No.: 67,496

[22] Filed: May 25, 1993

[51] Int. Cl.$^5$ ............................................... C08F 20/70
[52] U.S. Cl. ...................................... 525/187; 525/64; 525/66; 525/72; 525/209; 525/232
[58] Field of Search ................... 525/64, 66, 72, 187, 525/287, 232, 209

[56] References Cited

U.S. PATENT DOCUMENTS

| | | | |
|---|---|---|---|
| 3,654,370 | 4/1972 | Yeakely | 260/584 B |
| 3,847,992 | 11/1974 | Moss | 260/584 B |
| 4,014,836 | 3/1977 | Kraft et al. | 526/274 |
| 4,181,682 | 1/1980 | Watts, Jr. et al. | 260/584 B |
| 4,618,717 | 10/1986 | Renken et al. | 564/475 |
| 5,109,033 | 4/1992 | Grey et al. | 521/147 |
| 5,116,882 | 5/1992 | Grey et al. | 521/147 |

FOREIGN PATENT DOCUMENTS 0484832  5/1992  European Pat. Off. .

OTHER PUBLICATIONS

High-Molecular-Weight Poly(alkylene phosphate)s and Preparation of Amphiphilic Polymers Thereof, *Macromolecules*, 26 (1993) 2228.

*Primary Examiner*—James J. Seidleck
*Assistant Examiner*—Patrick R. Delaney
*Attorney, Agent, or Firm*—Jonathan L. Schuchardt

[57] ABSTRACT

Thermoplastic resins of the invention are reaction products of vinyl aromatic/vinyl phosphonic acid copolymers and amine-terminated polymers. The flexible products, which contain ammonium linkages, are surprisingly transparent, and are useful for packaging, as fire-retardant polymers or polymer additives, and as polymer compatibilizers.

21 Claims, No Drawings

THERMOPLASTIC RESINS BASED ON VINYL AROMATIC/VINYL PHOSPHONIC ACID COPOLYMERS AND AMINE-TERMINATED POLYMERS

FIELD OF THE INVENTION

The invention relates to thermoplastic resin compositions. In particular, the compositions of the invention are ionically linked reaction products of vinyl aromatic/vinyl phosphonic acid copolymers and amine-terminated polymers. These flexible products are particularly useful for packaging, for coatings, as fire-retardant polymers or additives, and as polymer compatibilizers.

BACKGROUND OF THE INVENTION

Copolymer compositions based on vinyl aromatic monomers and vinyl phosphonic acid derivatives are known in the art. For example, Grey et al. (U.S. Pat. Nos. 5,109,033 and 5,116,882) teach how to make polymer beads by an aqueous suspension polymerization process, and to prepare foamed articles similar to polystyrene foam by expanding the beads in a mold with steam. These polymers have pendent phosphonic acid groups when a vinyl phosphonic acid monomer is used.

U.S. Pat. No. 5,310,808, filed Jul. 30, 1992, describes noncellular flame-retardant thermoplastic copolymers based on vinyl phosphonic acid derivatives. These copolymers are grafted onto a rubber such as styrene-butadiene rubber. Chemical incorporation of a sufficient amount of the vinyl phosphonate monomer makes these compositions flame retardant, while grafting onto rubber improves flexibility and impact properties.

A limiting disadvantage of vinyl aromatic/vinyl phosphonic acid copolymers that are not grafted onto rubber is that they can be rather brittle. Other ways of imparting flexibility to these polymers without the need to polymerize in the presence of a rubber would be valuable.

Although numerous useful rubber-toughened styrenic polymers are known (e.g., high-impact polystyrene (HIPS), ABS, and rubber-modified styrene-maleic anhydride copolymers), these polymers are generally opaque, which limits their potential utility in applications such as coatings and clear packaging.

U.S. Pat. No. 5,237,028, filed Dec. 12, 1991, describes compositions useful for absorbing organic liquids. These compositions are reaction products of phosphonic acid group-containing polymeric resins and diamines or polyamines, including low molecular weight diamines and polyamines. Mono-functional amines are not suitable for use.

Amine-terminated polymers are also well known. Examples include amine-terminated polybutadiene and amine-terminated polyethers such as JEFFAMINE polyethers (products of Texaco Chemical Company). These polymers are particularly useful in the polyurethane industry, but have not been used to improve the flexibility of copolymers derived from vinyl aromatic monomers and vinyl phosphonic acids.

Still needed are new ways to make elastomeric, nonbrittle copolymers from vinyl aromatic monomers and vinyl phosphonic acid monomers, particularly without the need to copolymerize the vinyl monomers in the presence of a rubber. Also desirable are styrenic polymers that are elastomeric and transparent, which would be useful for clear packaging and coatings.

SUMMARY OF THE INVENTION

The invention is a thermoplastic resin composition. The composition comprises the reaction product of: (a) a copolymer of a vinyl aromatic monomer and a vinyl phosphonic acid monomer; and (b) an amine-terminated polymer having a glass-transition temperature less than about 0° C. The amine-terminated polymer is used in an amount effective to impart flexibility to the resin. The composition contains one or more ammonium linkages resulting from the reaction of the phosphonic acid moieties of the vinyl copolymer with amine groups of the amine-terminated polymer.

Optionally, the vinyl aromatic monomer and the vinyl phosphonic acid monomer are copolymerized in the presence of one or more additional ethylenically unsaturated monomers. The polymerization is also optionally performed in the presence of a rubber so that the vinyl aromatic/vinyl phosphonic acid copolymer is grafted onto a rubber.

Reaction of the vinyl aromatic/vinyl phosphonic acid copolymer with a sufficient amount of an amine-terminated polymer having a glass transition temperature less than about 0° C. results in a tough, flexible resin that has reduced brittleness compared with the copolymer that has not been reacted with an amine-terminated polymer. The product can be thermally processed like conventional thermoplastics. It is believed that the ammonium linkages are reversible under the conditions used to process the polymer. In addition, the elastomeric product of the invention is surprisingly transparent, making it useful for applications that have not previously been available to opaque, rubber-toughened styrenic polymers.

DETAILED DESCRIPTION OF THE INVENTION

The compositions of the invention are thermoplastic resins prepared by reacting vinyl aromatic/vinyl phosphonic acid copolymers with amine-terminated polymers.

Vinyl aromatic monomers useful in the invention are aromatic hydrocarbons that contain a vinyl or α-substituted vinyl group. Suitable vinyl aromatic monomers include, but are not limited to, styrene, alkyl-substituted styrenes, vinyl naphthalenes, α-methylstyrene, alkyl-substituted α-methylstyrenes, tert-butylstyrenes, halogenated styrenes, alkoxystyrenes, hydroxystyrenes, acetoxystyrenes, α-carboxystyrenes (acids and esters), α-alkoxystyrenes (vinyl ethers), α-cyanostyrenes, asiloxystyrenes, and the like, and mixtures thereof. Styrene, alkyl-substituted styrenes, and halogenated styrenes are preferred.

A vinyl phosphonic acid is copolymerized with the vinyl aromatic monomer. Preferred vinyl phosphonic acids have the general structure:

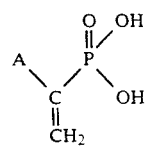

in which A is a monovalent radical selected from the group consisting of hydrogen, $C_1$–$C_{30}$ alkyl, aryl, aralkyl, and halogen-substituted alkyl and aryl. Preferably, A is an aryl or halogen-substituted aryl group. Suitable vinyl phosphonic acids include, but are not limited to, vinyl phosphonic acid, 1-methylvinyl-1-phosophonic acid, 1-phenylvinyl-1-phosphonic acid, 1-(4-bromophenyl)vinyl-1-phosphonic acid, and the like, and mixtures thereof.

Up to about 50 mole percent of the vinyl phosphonic acid monomer can be copolymerized with the vinyl aromatic monomer. A preferred composition comprises from about 75 to about 99 mole percent of the vinyl aromatic monomer and from about 1 to about 25 mole percent of the vinyl phosphonic acid. A more preferred range is from about 80 to about 99 mole percent of the vinyl aromatic monomer and from about 1 to about 20 mole percent of the vinyl phosphonic acid.

The copolymer of the vinyl aromatic monomer and the vinyl phosphonic acid monomer optionally further includes recurring units of one or more additional ethylenically unsaturated monomers. Suitable ethylenically unsaturated monomers include, but are not limited to, conjugated dienes (isoprene, 1,3-butadiene), vinyl halides, α-olefins (ethylene, propylene), vinyl esters of carboxylic acids (vinyl acetate), aryl and alkyl esters of acrylic, methacrylic, and α-phenylacrylic acid (methyl methacrylate, benzyl acrylate, methyl α-phenylacrylate), acrylic, methacrylic, and α-phenylacrylic acids, amides of ethylenically unsaturated carboxylic acids (acrylamide, methacrylamide, α-phenylacrylamide), nitriles of ethylenically unsaturated carboxylic acids (acrylonitrile, methacrylonitrile, α-phenylacrylonitrile), alkyl vinyl ethers (methyl vinyl ether), unsaturated anhydrides of dicarboxylic acids (maleic anhydride), and the like, and mixtures thereof. The ethylenically unsaturated monomer is used in an amount less than that which will destroy the desired flexibility and/or transparency of the thermoplastic resin product.

The copolymer of the vinyl aromatic monomer and the vinyl phosphonic acid is optionally grafted onto a rubber. The rubber will have a glass transition temperature less than about 0° C., and preferably less than about −20° C. Suitable rubbers are derived from olefin-containing monomers, and include, but are not limited to, polybutadiene, polyisoprene, nitrile rubber, EPDM rubber, styrene-isoprene copolymers, styrene-butadiene copolymers, and the like, and mixtures thereof. The rubber can be a homopolymer or a random, block, or graft copolymer.

When the vinyl aromatic/vinyl phosphonic acid copolymer is grafted onto a rubber, it is preferred to use an amount of rubber within the range of about 1 to about 50 weight percent based on the amount of vinyl aromatic/vinyl phosphonic acid copolymer. A more preferred range is from about 2 to about 20 weight percent; most preferred is the range from about 4 to about 18 weight percent.

The thermoplastic resin compositions of the invention include an amine-terminated polymer. The amine-terminated polymer will have a glass-transition temperature less than about 0° C., preferably less than about −20° C. Suitable amine-terminated polymers have primary, secondary, or tertiary amine groups, or mixtures of these. Amine-terminated polymers containing a proportion of quaternized amine end groups can be used as long as some proportion of the polymer contains free amine groups. The amine-terminated polymer can have any desired amine functionality (i.e., the average number of amine groups per polymer molecule); preferably, the average amine functionality will be within the range of about 1 to about 6.

The amount of amine-terminated polymer used is the amount effective to impart flexibility to the resin. The amount will vary depending upon many factors, including choice of monomers, whether the copolymer is grafted onto a rubber, choice of amine-terminated polymer, etc., as the skilled person will appreciate. Generally, however, the amount of amine-terminated polymer will be at least about 20 weight percent based on the amount of thermoplastic resin. A preferred range for the amine-terminated polymer is from about 30 to about 50 weight percent; more preferred is the range from about 35 to about 45 weight percent.

The amine-terminated polymer will have a number average molecular weight within the range of about 300 to about 30,000, preferably from about 500 to about 10,000, and more preferably from about 1,000 to about 5,000.

Suitable amine-terminated polymers include amine-terminated polyolefins such as polyisobutylene, polyisoprene, polybutadiene, and the like, terminated with primary, secondary, or tertiary amine groups. Amine-terminated polyethers such as amine-terminated poly(oxyalkylene) polymers are also suitable. These include JEFFAMINE polyethers, which are produced by Texaco Chemcial Company. The amine-terminated polyethers can be produced by a number of well-known methods, including those described in U.S. Pat. Nos. 4,618,717, 4,181,682, 3,847,992, and 3,654,370, the teachings of which are incorporated herein by reference in their entirety.

The thermoplastic resins of the invention are produced by first copolymerizing the vinyl aromatic monomer and vinyl phosphonic acid monomer, optionally in the presence of a rubber, and optionally in the presence of one or more additional ethylenically unsaturated monomers. Any suitable polymerization technique can be used, including aqueous suspension polymerization as well as solution, bulk, or emulsion polymerization. The preparation of vinyl aromatic/vinyl phosphonic acid copolymers by aqueous suspension polymerization is shown below in Example A, and is also illustrated in U.S. Pat. Nos. 5,109,033 and 5,116,882, the teachings of which are incorporated herein by reference in their entirety. The solution polymerization technique is illustrated below in Example B.

Films of these polymers can be cast, but they usually lack flexibility and/or transparency. Both of these qualities can be improved if a sufficient amount of an amine-terminated polymer is reacted with the phosphonic acid-containing copolymer.

The reaction of the vinyl aromatic/vinyl phosphonic acid copolymer with the amine-terminated polymer is easy to perform. It is convenient to simply combine a solution of the vinyl copolymer in an organic solvent with the desired amount of amine-terminated polymer at room temperature. The acid-base reaction to form an amine salt of the phosphonic acid is smooth and rapid. The reaction product can then be isolated from the organic solution in any suitable manner. If desired, the vinyl copolymer and the amine-terminated polymer can be combined, mixed, and reacted in the absence of a solvent and at elevated temperature. Such a technique is well suited for use with a thermoplastic extruder, for example.

Reaction of the vinyl aromatic/vinyl phosphonic acid copolymer with the amine-terminated polymer results in an elastomeric resin with improved flexibility compared with the unmodified vinyl copolymer. In the absence of grafting onto a rubber or reaction with an amine-terminated polymer, the vinyl aromatic/vinyl phosphonic acid copolymers are often too brittle for use.

A significant and unexpected advantage of the compositions of the invention is their transparency. While vinyl aromatic/vinyl phosphonic acid copolymers and vinyl copolymers grafted onto rubber are usually opaque, the reaction products of these copolymers with amine-terminated polymers are surprisingly transparent. This feature allows the compositions of the invention to be used for applications where transparency is required, such as clear packaging and coatings.

Another advantage of the compositions of the invention is that they can be thermally processed like conventional thermoplastics. Even when polyfunctional amine-terminated polymers are used, and crosslinking can be expected, the compositions remain thermally processable.

The following examples merely illustrate the invention. Those skilled in the art will recognize numerous variations that are within the spirit of the invention and scope of the claims.

EXAMPLE A

Preparation of Styrene/1-Phenylvinyl-1-phosphonic Acid (PVPA) Copolymer by Aqueous Suspension Polymerization The apparatus consists of a two-liter stainless steel reactor equipped with a nitrogen inlet, an air-driven stirrer, a heat-transfer coil within the reactor for circulating steam or cold water, thermocouples, a pressure gauge, and a temperature controller.

The reactor is charged with styrene (800 g), 1-phenylvinyl-1-phosphonic acid (PVPA) (96 g), tert-butyl perbenzoate (1.0 g), benzoyl peroxide (1.0 g), PAM 8173 partially hydrolyzed polyacrylamide (4.0 g, product of Nalco), terta-n-butylammonium bromide (57 g), sodium bisulfite (0.03 g), and distilled water (900 g). The reactor is purged with nitrogen, and the reaction mixture is then heated to 115° C. over 0.5 h. The mixture is heated at 115° C. for 5 h, and is then heated to 135° C. and maintained at 135° C. for 5 h. The mixture is cooled to 25° C., and the resulting polymer beads are isolated by filtration, washed with water, washed with isopropyl alcohol, and dried in a fume hood.

The resulting styrene/PVPA copolymer contains 1.3 wt. % phosphorous (determined by elemental analysis; calculated: 1.8 wt. %), and has $M_w = 334,000$ (by gel-permeation chromatography, polystyrene standards).

EXAMPLE 1

Reaction of Styrene/PVPA Copolymer with JEFFAMINE M-2005 Amine-terminated Polyether (primary amino)

Styrene/PVPA copolymer (as prepared in Example A) (60 g) is dissolved in tetrahydrofuran (1 L). To this solution is added JEFFAMINE M-2005 monoamine-terminated poly(propylene oxide) (40 g, product of Texaco Chemical Company). After 2 h of stirring at 25° C., the resulting polymer solution is spread onto an aluminum plate, is air-dried until most of the tetrahydrofuran evaporates, and is then dried in a vacuum oven at 100° C. A transparent polymer film results. Impact specimens are cut and tested. Mechanical properties: tensile strength at yield: 506 psi; elongation at yield: 16%, tensile strength at break: 546 psi; elongation at break: 131%.

EXAMPLE 2

Reaction of Styrene/PVPA Copolymer with Amine-terminated Polyether (secondary amino)

The procedure of Example 1 is followed, except that a secondary amine-terminated poly(propylene oxide) polymer (prepared from the reaction of methyl amine and a 1500 mol. wt. poly(oxypropylene) monol) is used in place of the primary amine-terminated JEFFAMINE polymer. The resulting product is transparent and flexible. This example demonstrates that the amine-terminated polymer need not have primary amino groups.

COMPARATIVE EXAMPLE 3

Film Casting of Styrene/PVPA Copolymer

The styrene/PVPA copolymer of Example A is not reacted with an amine-terminated polymer, but is simply dissolved in tetrahydrofuran and is cast onto an aluminum plate as described in Example 1. The film is too brittle to test mechanical properties. This example shows that reaction with an amine-terminated polymer is critical for obtaining a flexible product.

COMPARATIVE EXAMPLE 4

Reaction of Styrene/PVPA Copolymer with an Insufficient Proportion of Amine-terminated Polyether The styrene/PVPA copolymer of Example A (70 g) is reacted with JEFFAMINE M-2005 amine-terminated polyether (30 g) as described in Example 1. Casting of the polymer onto aluminum and curing as described in Example 1 gives a product that is too brittle to test for mechanical proporties.

Brittle films are also obtained when the styrene/PVPA to JEFFAMINE M-2005 amine-terminated polyether ratio is adjusted to 80:20 or 90:10.

This example shows that a sufficiently high level of amine-terminated polymer is needed to impart flexibility to the resin.

COMPARATIVE EXAMPLE 5

Reaction of Styrene/PVPA Copolymer with Octadecylamine

The procedure of Example 1 is followed, except that octadecylamine (40 g) is used in place of JEFFAMINE M-2005 amine-terminated polyether. The cast film of the resulting polymer is brittle, and cannot be tested. This result demonstrates that an amine-terminated polymer is needed for adequate flexibility.

COMPARATIVE EXAMPLE 6

Reaction of Styrene/PVPA Copolymer with Poly(oxypropylene) Monol

The procedure of Example 1 is followed, except that ARCOL R-1820 polyol, a 2000 molecular weight polyoxypropylene monol (product of ARCO Chemical Company) (40 g) is used in place of the JEFFAMINE M-2005 amine-terminated polyether. The cast film of the resulting polymer is brittle, and cannot be tested. This result shows that just having a polymer is not sufficient: the polymer needs to have at least one amine group.

EXAMPLE B

Preparation of Styrene/1-Phenylvinyl-1-phosphonic Acid (PVPA) Copolymer Grafted onto Styrene-Butadiene Rubber by Solution Polymerization The apparatus consists of a two-liter reaction kettle equipped with an addition pump, a stirrer, a temperature controller, a heating mantle, a condenser, and a nitrogen inlet.

A solution of styrene-butadiene rubber (STEREON S-721 rubber (90% butadiene content), a product of Firestone Synthetic Rubber & Latex Company) (10 wt. % in 1000 g styrene) is charged to the reactor with 1-phenylvinyl-1-phosphonic acid (PVPA) (50 g), chlorobenzene (300 g), and benzoyl peroxide (0.44 g). A mixture of PVPA (283 g), benzoyl peroxide (2.0 g), and tetrahydrofuran (126 g) is charged to the addition pump. The reaction kettle is purged with nitrogen. The reaction mixture is then heated with stirring to 115° C. over 0.5 h. The solution in the addition pump is then added continuously to the reaction kettle at 22 g/h while maintaining a reaction temperature of about 115° C. After monomer addition is complete, the polymerization continues at 115° C. for 2 h.

The reaction mixture is cooled to 60° C. Toluene (300 g), tetrahydrofuran (300 g), and 2,6-di-tert-butyl-4-methylphenol (BHT) (1.0 g) are added to dilute and stabilize the polymer solution. The terpolymer is precipitated from isopropyl alcohol and dried in a vacuum oven at 70° C. Yield: 499 g. The product contains 3.2 wt. % phosphorus, and has a $M_w = 96,000$. Tensile strength at break: 2500 psi; elongation at break: 3.3%.

EXAMPLE 7

Reaction of Styrene/PVPA Copolymer (grafted onto rubber) with JEFFAMINE M-2005/D-2000 Amine-terminated Polyethers The terpolymer of Example B (60 g) is dissolved in tetrahydrofuran (1000 g). To this solution is added JEFFAMINE D-2000 amine-terminated polyether (polyether diamine) (16.8 g) and JEFFAMINE M-2005 amine-terminated polyether (polyether monoamine) (23.2 g) (products of Texaco Chemical Company) with stirring at 25° C. After 2 h of stirring, the resulting polymer solution is spread onto an aluminum plate, is air-dried in a hood until most of the tetrahydrofuran evaporates, and is dried in a vacuum oven at 100° C. A transparent polymer film (0.03") results. Tensile impact specimens are cut and tested. Mechanical properties: tensile strength at yield: 727 psi; elongation at yield: 10.7%; tensile strength at break: 554 psi; elongation at break: 136%.

COMPARATIVE EXAMPLE 8

Film Casting of Styrene/PVPA Copolymer (grafted onto rubber)

The styrene/PVPA copolymer grafted onto rubber of Example B is not reacted with an amine-terminated polymer, but is simply dissolved in tetrahydrofuran and is cast onto an aluminum plate as described in Example 7. The film is not brittle, but is opaque. Thus, grafting a styrene/PVPA copolymer onto rubber can give a flexible product, but further reaction with an amine-terminated polymer is needed to give a transparent product.

The preceding examples are meant as illustrations; the invention is defined by the following claims.

We claim:

1. A thermoplastic resin composition comprising the reaction product of:
    (a) a copolymer of a vinyl aromatic monomer and a vinyl phosphonic acid monomer; and
    (b) an amine-terminated polymer having a glass-transition temperature less than about 0° C. in an amount effective to impart flexibility to the resin; wherein the reaction product contains one or more ammonium linkages.

2. The composition of claim 1 wherein the copolymer of the vinyl aromatic monomer and the vinyl phosphonic acid monomer further includes recurring units of one or more additional ethylenically unsaturated monomers in an amount less than that which will destroy the desired flexibility and/or transparency of the composition.

3. The composition of claim 2 wherein the ethylenically unsaturated monomer is selected from the group consisting of conjugated dienes, vinyl halides, α-olefins, vinyl esters of carboxylic acids, aryl and alkyl esters of acrylic, methacrylic, and α-phenylacrylic acid, acrylic, methacrylic, and α-phenylacrylic acids, amides of ethylenically unsaturated carboxylic acids, nitriles of ethylenically unsaturated carboxylic acids, alkyl vinyl ethers, unsaturated anhydrides of dicarboxylic acids, and mixtures thereof.

4. The composition of claim 1 wherein the vinyl aromatic monomer is styrene.

5. The composition of claim 1 wherein the vinyl phosphonic acid monomer has the structure:

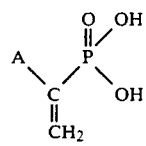

in which A is selected from the group consisting of aryl and halogen-substituted aryl groups.

6. The composition of claim 1 wherein the copolymer of the vinyl aromatic monomer and the vinyl phosphonic acid monomer is grafted onto a rubber having a glass-transition temperature less than about 0° C.

7. The composition of claim 6 wherein the rubber is selected from the group consisting of polybutadiene, polyisoprene, nitrile rubber, EPDM rubber, styrene-isoprene copolymers, styrene-butadiene copolymers, and mixtures thereof.

8. The composition of claim 1 wherein the amine-terminated polymer is selected from the group consisting of amine-terminated polyolefins and amine-terminated polyethers.

9. The composition of claim 8 wherein the amine-terminated polymer has an average amine functionality from about 1 to about 6.

10. The composition of claim 8 wherein the amine-terminated polymer is an amine-terminated polyether that is used in an amount within the range of about 30 to about 50 weight percent based on the amount of thermoplastic resin.

11. The composition of claim 1 wherein the resin is transparent.

12. A thermoplastic resin composition comprising the reaction product of:

(a) a copolymer of styrene and a vinyl phosphonic acid monomer having the structure:

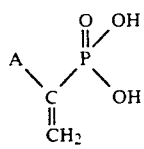

in which A is selected from the group consisting of aryl and halogen-substituted aryl groups; and (b) an amine-terminated polymer having a glass-transition temperature less than about 0° C. in an amount effective to impart flexibility to the resin;

wherein the reaction product contains one or more ammonium linkages.

13. The composition of claim 12 wherein the copolymer of styrene and the vinyl phosphonic acid monomer further includes recurring units of one or more additional ethylenically unsaturated monomers in an amount less than that which will destroy the desired flexibility and/or transparency of the composition.

14. The composition of claim 13 wherein the ethylenically unsaturated monomer is selected from the group consisting of conjugated dienes, vinyl halides, α-olefins, vinyl esters of carboxylic acids, aryl and alkyl esters of acrylic, methacrylic, and α-phenylacrylic acid, acrylic, methacrylic, and α-phenylacrylic acids, amides of ethylenically unsaturated carboxylic acids, nitriles of ethylenically unsaturated carboxylic acids, alkyl vinyl ethers, unsaturated anhydrides of dicarboxylic acids, and mixtures thereof.

15. The composition of claim 12 wherein the copolymer of styrene and the vinyl phosphonic acid monomer is grafted onto a rubber having a glass-transition temperature less than about 0° C.

16. The composition of claim 15 wherein the rubber is selected from the group consisting of polybutadiene, polyisoprene, nitrile rubber, EPDM rubber, styrene-isoprene, copolymers, styrene-butadiene copolymers, and mixtures thereof.

17. The composition of claim 12 wherein the amine-terminated polymer is selected from the group consisting of amine-terminated polyolefins and amine-terminated polyethers.

18. The composition of claim 17 wherein the amine-terminated polymer has an average amine functionality from about 1 to about 6.

19. The composition of claim 17 wherein the amine-terminated polymer is an amine-terminated polyether that is used in an amount within the range of about 30 to about 50 weight percent based on the amount of thermoplastic resin.

20. A transparent thermoplastic resin composition comprising the reaction product of:
(a) a copolymer of styrene and 1-phenylvinyl-1-phosphonic acid; and
(b) an amine-terminated polyether having a glass-transition temperature less than about 0° C. in an amount within the range of about 30 to about 50 weight percent based on the amount of thermoplastic resin;
wherein the reaction product contains one or more ammonium linkages.

21. The composition of claim 20 wherein the copolymer of styrene and 1-phenylvinyl-1-phosphonic acid is grafted onto a rubber having a glass-transition temperature less than about 0° C. selected from the group consisting of polybutadiene, polyisoprene, nitrile rubber, EPDM rubber, styrene-isoprene copolymers, styrene-butadiene copolymers, and mixtures thereof.

* * * * *